United States Patent [19]

Luebke et al.

[11] 3,981,044

[45] Sept. 21, 1976

[54] RECEPTACLE HANDLE ASSEMBLY

[75] Inventors: Clem J. Luebke, Beloit, Wis.;
Norman L. Beck, Rockton; Lowell W. Daniels, Rockford, both of Ill.

[73] Assignee: The Broaster Co., Rockton, Ill.

[22] Filed: May 27, 1975

[21] Appl. No.: 580,595

[52] U.S. Cl. ............................... 16/114 A; 16/115; 220/94 R
[51] Int. Cl.² ......................................... A47J 45/06
[58] Field of Search ............ 16/114 A, 115, 110 A, 16/114 R, 110 R; 220/96, 94 R; 222/465; 294/27 R, 27 H, 34; 224/48 E

[56] References Cited
UNITED STATES PATENTS

| | | | |
|---|---|---|---|
| 864,372 | 8/1907 | Hoffmann et al. | 16/114 A |
| 1,015,176 | 1/1912 | Hall | 220/94 R |
| 1,667,519 | 4/1928 | Hechler | 16/114 A |
| 1,763,066 | 6/1930 | Rooney | 16/114 R |
| 3,334,782 | 8/1967 | Friberg | 220/94 R |

*Primary Examiner*—Andrew V. Kundrat
*Attorney, Agent, or Firm*—Meyer, Tilberry & Body

[57] ABSTRACT

A handle assembly is disclosed for the basket of deep fat frying apparatus. The handle assembly includes a bracket mounted on the basket, and a handle unit including a handle member mounted on an attaching plate which is slidably supported by the bracket. The handle unit is removable from the bracket and positionally adjustable along the vertical length thereof. A pivotal latch on the handle unit is interengageable with keeper slots in the bracket to position the handle member relative to the bracket, and a thumb operator is provided for pivoting the latch. The latch includes a detent interengageable with a keeper slot to prevent pivotal movement of the latch when the basket is supported in suspension by the handle.

19 Claims, 6 Drawing Figures

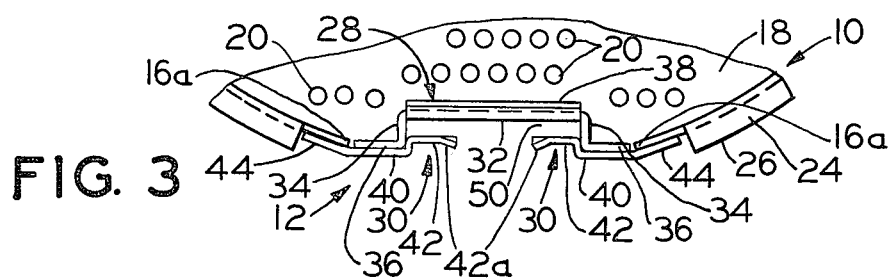
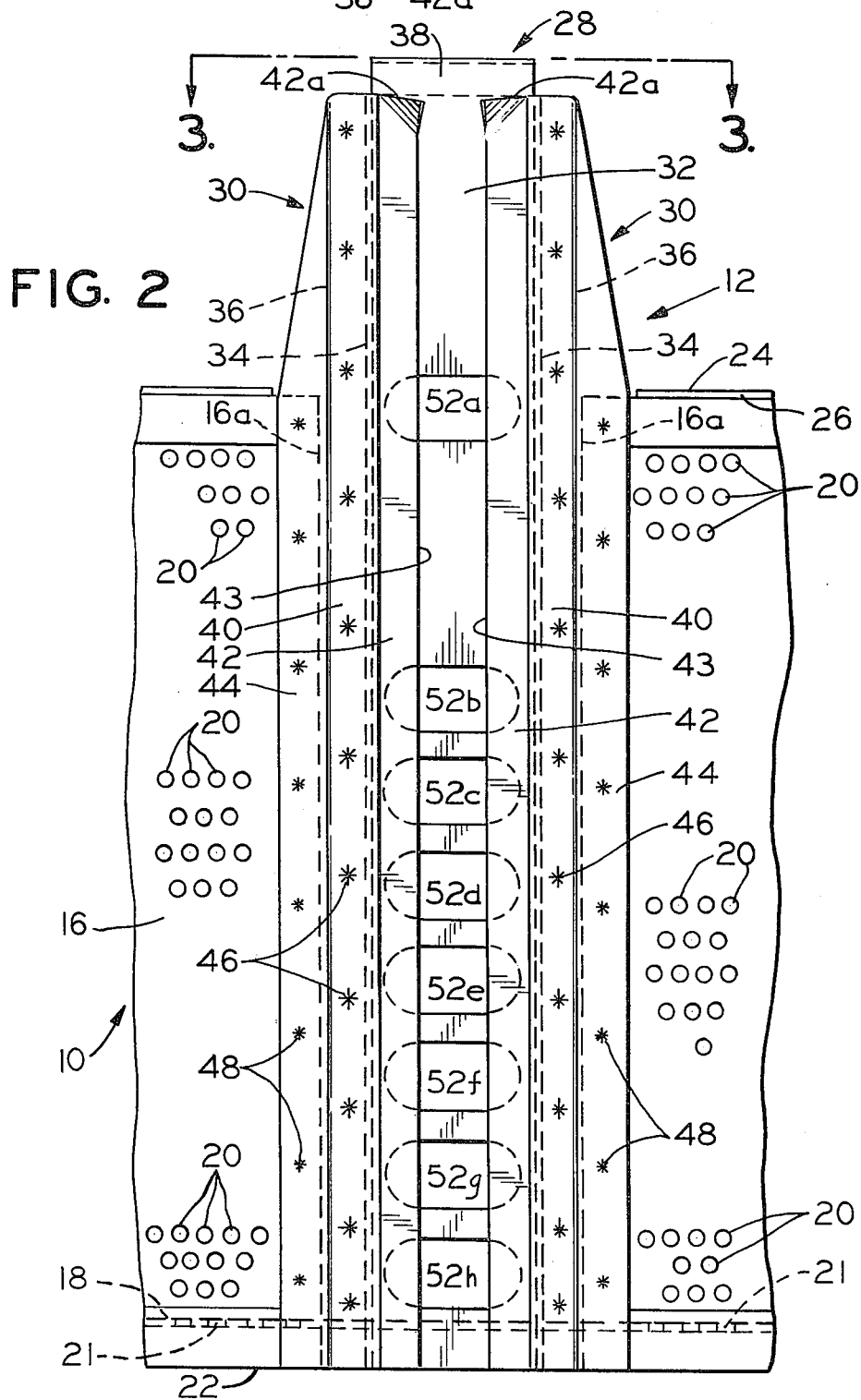

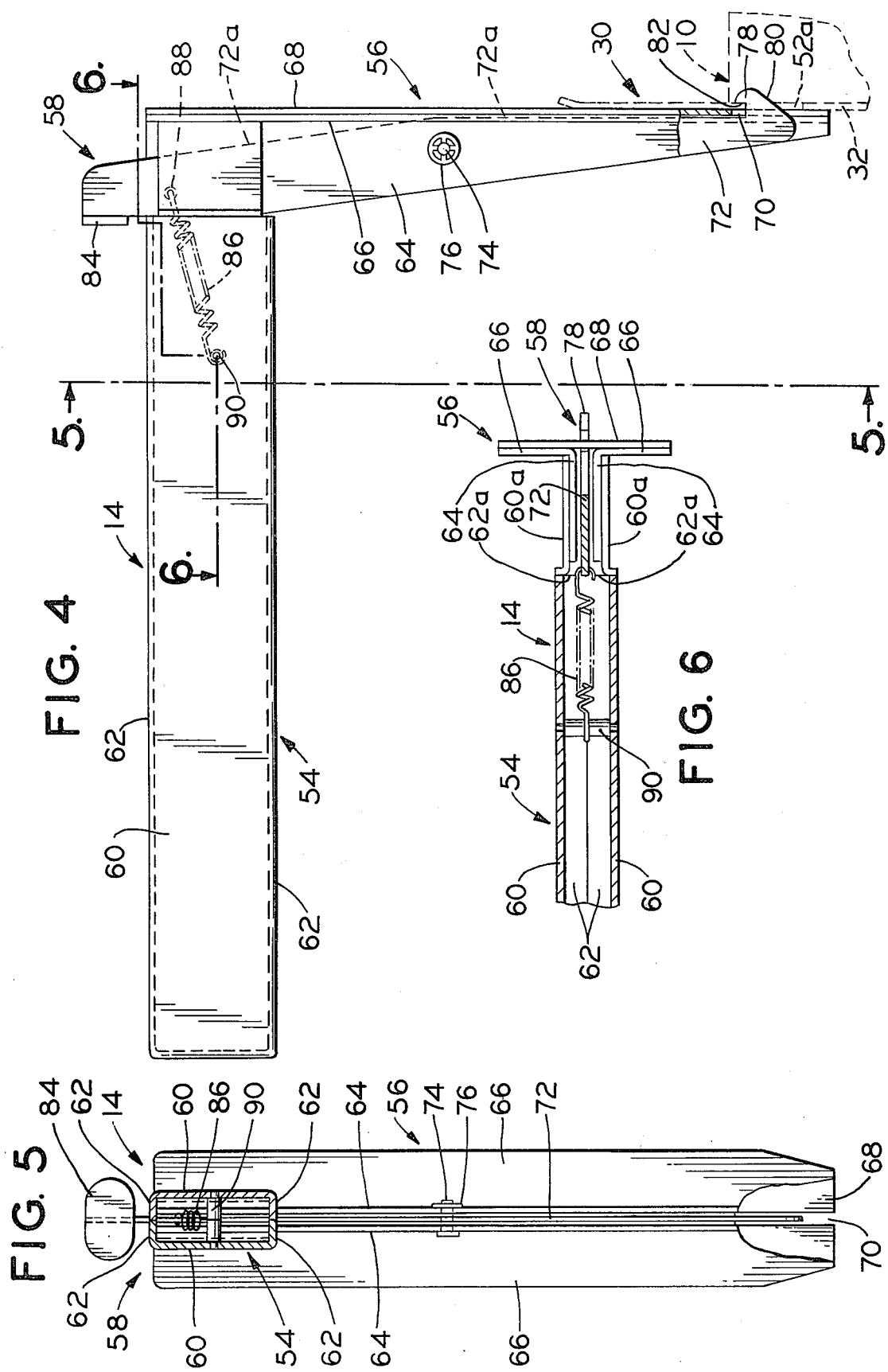

RECEPTACLE HANDLE ASSEMBLY

This invention relates to the art of receptacles and, more particularly, to a handle assembly for receptacles.

The handle assembly of the present invention finds particular utility in connection with foraminous baskets in which articles of food to be cooked are placed and then immersed with the basket in a vat of fat, grease or the like. Accordingly, the handle assembly of the present invention will be described in particular with reference to such a basket, but it will be appreciated that the handle assembly is adapted for use with other receptacle structures.

In the art of deep fat frying of foods, such as chicken and fish fillets for example, relatively large quantities of food are placed in a foraminous basket which is immersed in a vat of fat or other frying liquid to achieve cooking of the food. The basket is manually withdrawn from the vat following a cooking operation, turned about a horizontal axis to empty the cooked food therefrom, and then refilled and replaced in the vat for the next cooking operation. Generally, the vat has an open top closely conforming in cross-sectional dimension to that of the basket, and the basket is loaded and unloaded with respect to the vat by vertical movement of the basket into and out of the opening. Further, the basket is generally disposed in the vat with the top edge of the basket spaced below the opening. Accordingly, handling of the basket during loading and unloading operations is difficult and is potentially dangerous in view of the temperature of the apparatus and the hot grease which clings to the food and basket and must be initially drained therefrom upon withdrawal of the basket from the vat. In addition to the latter basket handling problems, a potentially dangerous and difficult manipulation procedure is encountered in connection with emptying the basket after a cooking operation. In this respect, the basket and cooked food must be tilted or inverted by rotation about a horizontal axis to dump the food therein. The heat of the food and basket, and the weight of the food, make this procedure quite difficult and potentially dangerous for the person handling the basket.

It becomes advantageous in view of the foregoing problems to provide such a basket with a handle assembly structurally associated with the basket so as to facilitate with safety, both loading and unloading of the basket with respect to the vat and the turning of a filled basket upside down to dump the food therefrom. Such a handle assembly is provided in accordance with the present invention. More particularly, the handle assembly of the present invention includes a bracket mountable on the side wall of a receptacle, and a handle unit movably and removably interengaged with the bracket. The handle unit is adapted to be selectively positioned with respect to the bracket at a plurality of locations in the direction between the top and bottom edges of the receptacle. These positions include at least one in which a handle member of the handle unit is disposed generally at or above the top edge of the receptacle, and at least one in which the handle member is spaced below the top edge of the receptacle.

In connection with a deep fat fryer basket, the first position of the handle facilitates manual manipulation of the basket with food therein during loading and unloading of the basket into a deep fryer vat. In this respect, the axis of the handle is well above the center of gravity of the filled basket whereby the basket is stabilized for carrying, lifting and lowering operations. In the second handle position, the handle axis is below the top edge of the basket, and preferably, close to the center of gravity of the filled basket. This handle position facilitates manual turning of the basket by the handle and about the handle axis to dump food therefrom. The ease of turning is of course dependent on the quantity and weight of food in the basket and the location of the handle axis relative to the center of gravity as determined by the quantity and weight of food. In any event, however, if the handle axis is generally at the center of gravity a very slight tipping action is all that is required to initiate turning movement of the basket. Accordingly, the basket can be emptied with minimum physical effort.

In accordance with a preferred embodiment of the invention, the bracket extends vertically from the bottom edge of a deep fat fryer basket to a location spaced above the top edge of the basket. The bracket is provided with a plurality of apertures each corresponding to a position of the handle relative to the basket. The handle unit is slidably received in the bracket and is provided with a pivotal latch adapted to be selectively interengaged with the bracket apertures. The uppermost aperture in the bracket positions the handle well above the top edge of the basket, and the lowermost aperture in the bracket is adjacent the bottom edge of the basket and thus best positions the handle for turning the basket. The bracket apertures between the uppermost and lowermost apertures provide for selectively positioning the handle between the uppermost and lowermost positions thereof. With this selectivity, the basket can be withdrawn from the vat following a cooking operation and the handle adjusted downwardly from the uppermost position to facilitate carrying the basket and/or turning the basket. The extent to which the handle is adjusted downwardly from its uppermost position will depend upon the quantity and weight of food in the basket and upon the degree of difficulty expected by a given person with regard to carrying and/or turning the basket.

In accordance with another aspect of the invention, the pivotal latch on the handle unit is thumb actuable and is provided with a detent adapted to interengage with the bracket to prevent disengagement between the latch and bracket without first moving the handle downwardly relative to the bracket. This feature advantageously avoids the possibility of a person inadvertently actuating the latch to release the handle from the bracket when the basket is supported in suspension by the handle.

An outstanding object of the present invention is the provision of an improved handle assembly for a receptacle and in which a handle member is adjustable relative to the receptacle to selectively facilitate lifting and lowering movements of the receptacle and turning of the receptacle to an inverted disposition.

Another object of the invention is the provision of an improved handle assembly of the foregoing character in which the handle member is selectively adjustable relative to the receptacle in a plurality of positions in the direction between the top and bottom edges of the receptacle.

Another object is the provision of a handle assembly of the foregoing character in which one of the selective positions locates the handle above the top edge of the receptacle and another of the positions locates the handle below the top edge of the receptacle.

A further object is the provision of a handle assembly of the foregoing character by which manual manipulation of the receptacle is facilitated with minimum effort and danger of injury to a person handling the receptacle.

Yet a further object is the provision of a handle assembly of the foregoing character including a bracket mountable on the receptacle and a handle unit slidably interengageable with the bracket and removable therefrom, and in which the bracket and handle unit are provided with a releaseable interengaging latch and keeper arrangement.

Still another object is the provision of a handle assembly of the foregoing character in which the latch and keeper arrangement prevents unintentional release of the handle from the bracket when the receptacle is supported by the handle.

Yet another object is the provision of a handle assembly for a foraminous deep fat fryer basket including a bracket mountable on the basket and a handle unit slidably interengageable with the bracket and selectively positionable relative thereto to locate the handle either above the top edge of the basket or at a location spaced below the top edge of the basket and generally corresponding with the center of gravity of the basket.

The foregoing objects, and others, will in part be obvious and in part pointed out more fully hereinafter in connection with the description of a preferred embodiment of the invention illustrated in the accompanying drawings in which:

FIG. 2 is an elevational view of the bracket component of the handle assembly;

FIG. 3 is a top view of the bracket as seen along line 3—3 in FIG. 2;

FIG. 4 is a side elevation view of the handle unit of the assembly;

FIG. 5 is an elevational view of the handle unit, partially in section, taken along line 5—5 in FIG. 4; and, FIG. 6 is a plan view, in section, of a portion of the handle taken along line 6—6 in FIG. 4.

Figure 1:
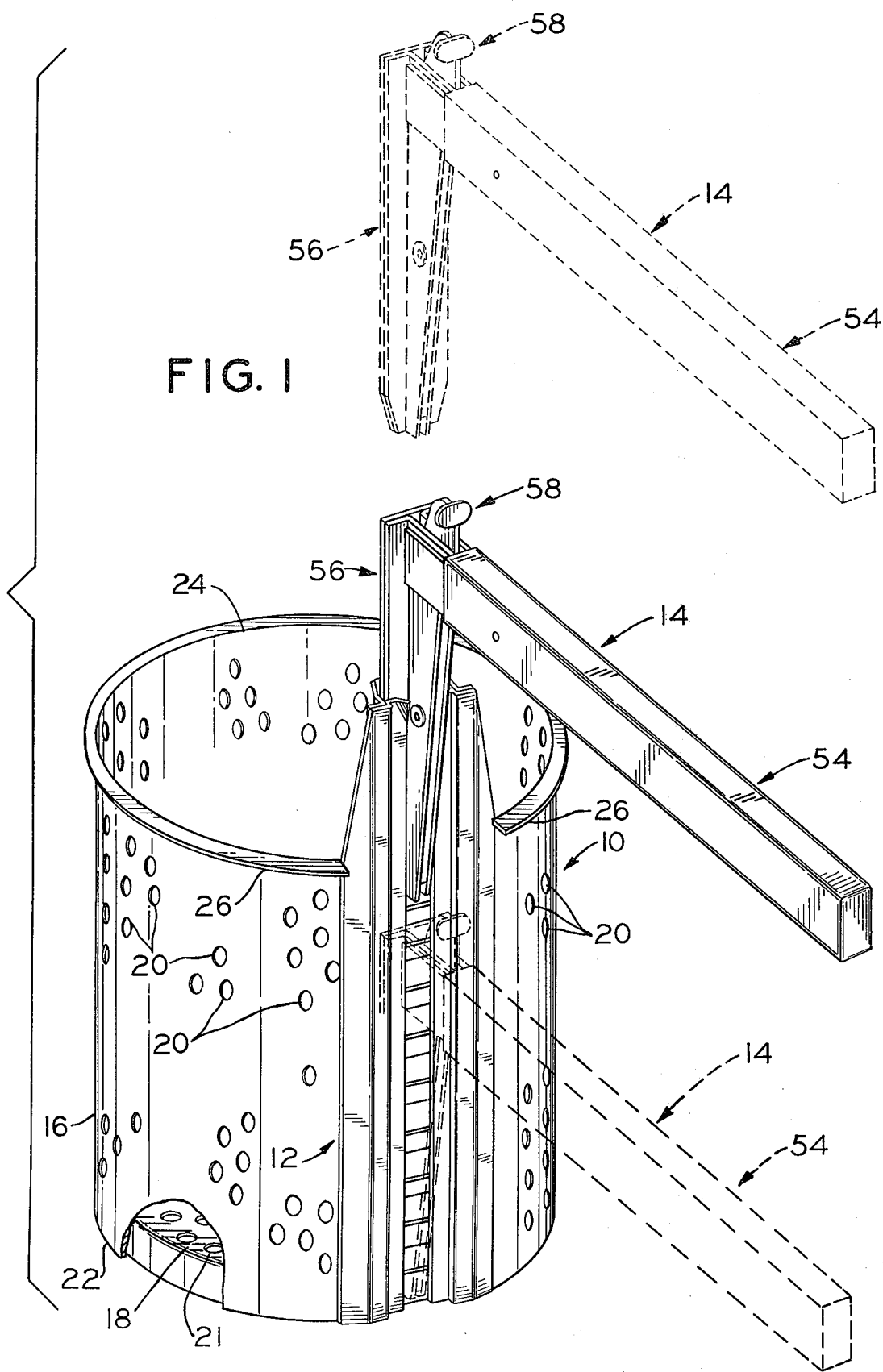
FIG. 1 is a perspective view of a deep fat fryer basket including a handle assembly made in accordance with the present invention.

Referring now in greater detail to the drawings wherein the showings are for the purpose of illustrating a preferred embodiment of the invention only and not for the purpose of limiting the invention, FIG. 1 of the drawing illustrates a deep fat fryer type basket 10 provided with a handle assembly in accordance with the present invention. The handle assembly includes a bracket 12 attached to receptacle 10 and a handle unit 14 removably interengageable with bracket 12, as set forth more fully hereinafter. Receptacle 10 is cylindrical and includes a foraminous side wall 16 and a foramanious bottom wall 18. In the embodiment shown, side wall 16 and bottom wall 18 are produced from sheet metal and are provided with apertures 20 and 21 therethrough, respectively, to permit the free flow of cooking liquid into and out of the basket during use. Side wall 16 has a lower edge 22 and an upper edge 24. Edge 24 is defined by the top surface of a radially outwardly extending peripheral flange 26 which is integral with side wall 16 and rigidifies the upper end of the receptacle.

As seen in FIGS. 2 and 3, basket side wall 16 has opposed vertical end edges 16a circumferentially spaced apart to receive bracket 12 therebetween. As set forth more fully hereinafter, the vertically extending side portions of bracket 12 overlap the end edge portions of side wall 16 and are attached thereto by welding to mount the bracket on the receptacle. Flange 26 at the upper end of side wall 16 terminates adjacent the side edges of bracket 12, and the bracket extends from bottom edge 22 of the side wall to a location spaced above top edge 24 thereof.

With further reference to FIGS. 2 and 3, bracket 12 includes a channel member 28 and a pair of mounting plates 30. Channel 28 preferably is of one piece sheet metal construction and includes a web 32 and flanges along the opposite side edges thereof defined by flange portions 34 extending perpendicular to web 32 and flange portions 36 extending laterally outwardly from flange portions 34. The uppermost end of web 32 extends beyond the corresponding ends of flange portions 34 and 36 to provide a web extension 38. Extension 38 preferably is inclined relative to the plane of web 32 in the direction inwardly of the basket when the bracket is mounted thereon.

Mounting plates 30 each include a laterally central portion 40 overlying a corresponding flange portion 36, an inner portion 42 overlying and spaced from web 32 of channel 28, and an outer portion 44 extending laterally outwardly from the outer side edges of flange portions 36. Mounting plates 30 are attached to channel 28 by weldments 46 between the corresponding flange portion 36 of the channel member and intermediate portion 40 of the mounting plate. Outer portions 44 of mounting plates 30 extend circumferentially beyond the corresponding end edge 16a of basket wall 16, and bracket 12 is rigidly mounted on the basket by weldments 48 interconnecting mounting plate portions 44 and the underlying basket wall portions.

Web 32, flange portions 34 and inner portions 42 of mounting plates 30 cooperatively define a T-shaped handle unit receiving slot 50 extending between the upper and lower ends of the bracket. The innermost edges 43 of inner portions 42 of the mounting plates are laterally spaced apart for a handle member of the handle unit to extend outwardly therethrough, as set forth more fully hereinafter. Inclined web extension 38 facilitates guidance of the handle unit into the upper entrance end of slot 50 and, preferably, the upper, innermost corner portions 42a of inner portions 42 of the mounting plates are inclined outwardly with respect to web 32 to further facilitate guidance of handle unit insertion.

Web 32 of bracket 12 is provided with a plurality of apertures 52a–52h extending therethrough, each of which apertures is laterally aligned with the opening defined by inner edges 43 of inner portions 42 of mounting plates 30. Bracket 12 extends upwardly beyond the top edge 24 of basket wall 16, and the uppermost bracket aperture 52a is spaced from the upper entrance end of slot 50 at a location generally corresponding with the top edge of the basket wall. The next lower aperture 52b is spaced a considerable distance below aperture 52a, and the remaining apertures are generally equally spaced apart in the direction toward bottom edge 22 of basket wall 16. The lowermost aperture 52h preferably is located as close to the lower end of the bracket as possible. As will become apparent hereinafter, however, the number of apertures and the locations thereof can vary from the specific number and locations shown in the preferred embodiment.

Handle unit 14 is shown in detail in FIGS. 4–6 of the drawing. With reference to these Figures, the handle unit includes a handle member 54, an attaching plate structure 56, and a pivotal latch 58. Handle 54 preferably is of hollow sheet metal construction and is comprised of a pair of opposed channel-shaped handle plates having parallel spaced apart webs 60 and corresponding pairs of opposed, coplanar flanges 62. The handle plates are suitably interconnected, such as by welding along the lines of juncture between the opposed pairs of flanges 62. Flanges 62 have front edges 62a, and webs 60 extend beyond edges 62a to provide web extensions 60a. Web extensions 60a are parallel to one another, and each web extension is laterally offset inwardly from the corresponding web 60 adjacent flange edges 62a.

Attaching plate structure 56 includes a pair of vertically extending L-shaped plate members each having an upper portion interconnected with a corresponding one of the web extensions 60a. More particularly, each L-shaped plate member includes a leg 64 extending parallel to the corresponding web extension 60a and a leg 66 extending laterally outwardly of leg 64 adjacent the forwardmost edge of web extension 60a. The upper end of each leg 64 facially engages the inner surface of a corresponding web extension 60a and is rigidly fastened thereto such as by welding. The attaching plate structure further includes a face plate 68 facially engaging legs 66 of the L-shaped plate members and rigidly fastened thereto such as by welding. The lowermost end of face plate 68 is provided with a vertical slot 70 for the purpose set forth hereinafter.

Latch 58 includes a latch plate 72 disposed between legs 64 of the L-shaped plate members of the attaching plate structure. Latch plate 72 is interconnected with legs 64 by means of a pin 74 and a pin retaining lock washer 76. Further, latch plate 72 has a lower end provided with a latch finger 78 adapted to project through slot 70 in face plate 68. Latch finger 78 is provided with a cam edge 80 and a detent notch 82, which cam edge and detent notch serve the purposes set forth hereinafter.

The upper end of latch plate 72 is provided with a thumb plate 84 which is suitably attached thereto and by which the latch plate is adapted to be displaced to pivot latch finger 78 clockwise from the position shown in FIG. 4. The latch plate is biased toward the position shown in FIG. 4 by means of a coil spring 86 having its opposite ends connected one to an opening 88 in the latch plate and the other to a pin 90 mounted between webs 60 of the handle member. Pivotal movement of the latch plate counterclockwise about the pin 74 is limited by engagement of the latch plate with front edges 62a of the handle flanges and/or by engagement of the lower portion of front edge 72a of the latch plate with the inner surface of face plate 68.

Handle unit 14 is slidably interengageable with bracket 12 by inserting the lower end of attaching plate structure 56 downwardly into bracket slot 50 from the upper entrance end thereof. Such introduction of the mounting plate portion into the slot positions legs 66 and face plate 68 between web 32 and inner portions 42 of the bracket to capture the handle unit against displacement from the bracket in a direction perpendicular to web 32. When the attaching plate structure is disposed in bracket slot 50, face plate 68 facially engages web 32 of the bracket and web extensions 60a of the handle member extend outwardly through the opening between opposed inner edges 43 of inner portions 42 of bracket mounting plates 30.

As attaching plate structure 56 is advanced longitudinally into bracket slot 50, cam edge 80 of latch plate 72 engages web 32 to pivot the latch plate clockwise from the position shown in FIG. 4. When latch nose 78 reaches the uppermost aperture 52a in bracket web 32, spring 86 biases the latch plate counterclockwise, whereby nose 78 moves through aperture 52a to engage beneath the upper edge of the aperture. If insertion of the handle unit is stopped at this point, lifting of the basket by the handle unit will cause attaching plate structure 56 to move upwardly relative to the bracket so that the portion of web 32 defining the upper boundary of aperture 52a enters latch notch 82. This precludes pivotal movement of latch plate 72 clockwise from the position shown in FIG. 4 until such time as the handle unit is moved downwardly to release web 32 from notch 82. It will be appreciated, therefore, that inadvertent separation of the handle unit from the bracket and thus the basket is precluded when the basket is supported in suspension by the handle unit.

The relationship between the handle and basket when latch nose 78 engages uppermost bracket aperture 52a is shown by the solid line position of the handle unit in FIG. 1. It will be noted that handle 54 is spaced above top edge 24 of basket wall 16 and that the handle extends generally horizontally and radially of the basket. This position advantageously enables the basket with food to be cooked therein to be lowered downwardly into a deep fat fryer vat and to a cooking position in which the top edge of the basket is spaced below the top surface of the cooking apparatus. The basket is suitably supported within the apparatus, whereby the handle unit can be moved downwardly and thumb plate 84 depressed to pivot the latch plate clockwise. This releases latch nose 78 so that the handle unit can be removed from bracket 12 and thus the basket during the cooking operation.

Following the cooking operation, the handle unit is again interengaged with the bracket such that latch nose 78 engages bracket aperture 52a, and the basket is removed from the apparatus. At this time, the basket can be placed on a suitable support surface such as a table and the handle unit depressed relative to the bracket to move attaching plate portion 56 downwardly along slot 50. During such movement latch plate 72 is oscillated by engagement of cam edge 80 with the lower edge of aperture 52a and by movement of nose 78 into the succeeding aperture 52b. When the handle has been moved downwardly to the desired position, upward movement of the handle unit to lift the basket interengages bracket web 32 and latch notch 82 as described to prevent unintentional separation of the handle unit from the bracket. The lowered position of the handle which provides for the basket to be most easily turned is that in which latch nose 78 interengages with the lowermost bracket aperture 52h. This locates the handle relative to the basket as shown by the broken line position in FIG. 1 below the solid line handle position. In the lowermost position, the handle axis passes through the basket at a location between the bottom and top edges thereof which corresponds generally with the center of gravity of the basket. This position of the handle would be most desirable, for example, if the basket is substantially filled with food and/or the food therein is relatively heavy.

While considerable emphasis has been placed herein on the specific structures of the component parts of the handle assembly, and specific structural interrelationships therebetween, it will be appreciated that many modifications of the preferred embodiment can be made without departing from the principles of the present invention. For example, the handle assembly can be employed with receptacles other than foraminous baskets for deep fat frying apparatus, and the number and locations of positions to which the handle can be moved relative to the receptacle can be varied from the number and positions shown herein. Many embodiments of the present invention and changes in the preferred embodiment herein disclosed will be obvious upon reading the foregoing description. Accordingly, it is to be distinctly understood that the descriptive matter herein is to be interpreted merely as illustrative of the present invention and not as a limitation.

What is claimed is:

1. A handle assembly for a receptacle having a side wall comprising, a bracket mountable on said wall and having top and bottom ends with respect to said wall, a handle until selectively positionable with respect to said bracket at a plurality of locations in the direction between said top and bottom ends, said handle unit and said bracket including means cooperably interengaged to support said handle unit for sliding movement relative to said bracket in said direction, and said handle unit and said bracket further including actuable latch and keeper means releaseably interconnecting said handle unit against sliding movement when said handle unit is in each of said locations, said latch and keeper means including means interengaging to restrain actuation thereof.

2. The handle assembly according to claim 1, wherein said receptacle wall has top and bottom edges and said handle unit includes a handle member having an axis extending generally horizontally with respect to said receptacle, at least one of said locations positioning said handle member axis above said top edge of said receptacle.

3. The handle assembly according to claim 1, wherein said latch and keeper means includes keeper means on said bracket and latch means on said handle unit.

4. The handle assembly according to claim 3, wherein said latch means includes a latch member having an end displaceable between latched and released positions relative to said keeper means, and means biasing said latch member end toward the latched position thereof.

5. The handle assembly according to claim 4, wherein said keeper means includes a plurality of openings in said bracket each adapted to receive said latch member end, each of said openings being in a position along said bracket means corresponding to one of said locations.

6. The handle assembly according to claim 5, wherein said means interengaging to restrain actuation of said latch and keeper means includes means on said latch member end interengaging said bracket when said latch member end is received in said openings to restrain displacement of said latch member end from the latched to the released position thereof.

7. A handle assembly for a receptacle having a side wall comprising, a bracket mountable on said side wall and having top and bottom ends with respect to said side wall, a handle unit including attaching plate means having upper and lower ends and side portions extending therebetween, said bracket including means defining a generally T-shaped slot between said top and bottom ends having a bottom wall, said slot longitudinally receiving said attaching plate means and interengaging with said side portions to support said attaching plate means for longitudinal sliding movement in said slot, said bottom wall of said slot having a plurality of openings therein spaced apart in the direction between said top and bottom ends, and pivotal latch means carried by said handle unit and having a latching end pivotal relative to said bottom wall of said slot between latched and released positions with respect to each of said openings, said latching end in said latched position extending into one of said openings to interengage said attaching plate means against sliding movement in said slot in the direction from said bottom end toward said top end.

8. The handle assembly according to claim 7, wherein said pivotal latch means includes a latch arm mounted on said attaching plate means for pivotal movement about an axis between said upper and lower ends of said attaching plate means, said latch arm having an end adjacent said lower end of said attaching plate means and defining said latching end.

9. The handle assembly according to claim 8, wherein said latching end of said latch arm includes an upwardly open recess, said recess receiving a portion of said bottom wall of said slot when said latching end is in the latched position to block pivotal movement of said latching end to the released position.

10. The handle assembly according to claim 9, wherein said handle unit includes a handle member having one end interconnected with said upper end of said attaching plate means, said latch arm having an actuating end adjacent said one end of said handle member.

11. The handle assembly according to claim 10, and spring means biasing said latch arm to pivot in the direction to move said latching end toward the latched position thereof.

12. The handle assembly according to claim 11, wherein said latching end of said latch arm includes a cam edge engageable with said bottom wall of said slot to cam said latching end from the latched toward the released position thereof upon sliding movement of said attaching plate means in said slot in the direction from said top end toward said bottom end.

13. The handle assembly according to claim 7, wherein said receptacle side wall has a top edge and said handle unit includes a handle member interconnected with said attaching plate means adjacent said upper end thereof, said handle member having an axis extending generally horizontal when said attaching plate means is received in said slot, and at least one of said openings in said bottom wall of said slot being located to receive said latching end of said latch means and position said handle member with said axis thereof vertically spaced above said top edge of said side wall.

14. The handle assembly according to claim 7, wherein said bracket includes a channel member having a web portion defining said bottom wall of said slot and flange means along each of the side edges of said web portion, said bracket further including a mounting flange attached to each said flange means, each said mounting flange including a first portion spaced from and overlying said web portion and a second portion extending laterally outwardly from said flange means, said first portions having inner edges laterally spaced apart, and said first portions and said channel member together defining said T-shaped slot.

15. The handle assembly according to claim 14, wherein said receptacle side wall has a top edge and said top end of said bracket is spaced vertically above said top edge of said side wall.

16. The handle assembly according to claim 14, wherein said receptacle side wall has a top edge and said handle unit includes a handle member interconnected with said attaching plate means adjacent said upper end thereof, said handle member having an axis extending generally horizontal when said attaching plate means is received in said slot, and at least one of said openings in said bottom wall of said slot being located to receive said latching end of said latch means and position said handle member with said axis thereof vertically spaced above said top edge of said side wall.

17. The handle assembly according to claim 16, wherein said pivotal latch means includes a latch arm mounted on said attaching plate means for pivotal movement about an axis intermediate said upper and lower ends of said attaching plate means, said latch arm having a first end adjacent said lower end of said attaching plate means and defining said latching end and a second end adjacent said upper end of said attaching plate means, and spring means biasing said latch arm to move said latching end toward the latched position.

18. The handle assembly according to claim 17, wherein said latching end of said latch arm includes an upwardly open recess, said recess receiving said web portion of said channel member when said latching end is in the latched position to block pivotal movement of said latching end to the released position.

19. The handle assembly according to claim 18, wherein said latching end of said latch arm includes a cam surface engageable with said web portion of said channel member to cam said latching end from the latched toward the released position thereof upon sliding movement of said attaching plate means in said slot in the direction from said top end toward said bottom end.

* * * * *